(12) United States Patent
Wakamiya et al.

(10) Patent No.: US 6,481,277 B1
(45) Date of Patent: Nov. 19, 2002

(54) TEMPERATURE CONTROL UNIT AND SIGHT GLASS

(75) Inventors: Ted Wakamiya, San Ramon; Gerry Peffer, San Jose; Vincent L. Marinaro, Sunnyvale, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/767,619

(22) Filed: Jan. 23, 2001

(51) Int. Cl.$^7$ .......................... G01F 23/30; G01F 23/76; G01F 23/02; G01F 15/06
(52) U.S. Cl. .......................... 73/311; 73/309; 73/322.5; 73/323; 250/577
(58) Field of Search ..................... 73/311, 309, 322.5, 73/323; 250/577

(56) References Cited

U.S. PATENT DOCUMENTS

| | | | | | |
|---|---|---|---|---|---|
| 292,532 | A | * | 1/1884 | Beggs | 73/311 |
| 701,102 | A | * | 5/1902 | Tardy | 73/311 |
| 705,421 | A | * | 7/1902 | Moore | 73/311 |
| 1,185,985 | A | * | 6/1916 | Clewell | 73/311 |
| 1,193,744 | A | * | 8/1916 | Wilkinson | 73/311 |
| 1,414,298 | A | * | 4/1922 | Montero | 73/311 |
| 1,859,933 | A | * | 5/1932 | Nikonow | 73/309 |
| 2,554,374 | A | * | 5/1951 | Melas | 73/713 |
| 4,154,103 | A | * | 5/1979 | Filing | 73/315 |
| 4,421,459 | A | * | 12/1983 | Frey | 417/38 |

FOREIGN PATENT DOCUMENTS

| | | | | | |
|---|---|---|---|---|---|
| GB | | 2086576 A | * | 5/1982 | 73/311 |

* cited by examiner

*Primary Examiner*—Hezron Williams
*Assistant Examiner*—Katrina Wilson
(74) *Attorney, Agent, or Firm*—Foley & Lardner

(57) ABSTRACT

An apparatus for indicating a fluid level in a reservoir includes a conduit for communication with a reservoir and including a sight glass. A buoyant primary float is provided within the conduit, and a stop is provided within the conduit for engaging the primary float to prevent travel of the primary float beyond an upper portion of the conduit. A buoyant secondary float in the conduit is moveable together with the primary float when the primary float is not engaged by the stop, and is moveable separately from the primary float when the primary float is engaged by the stop and a fluid level in the conduit exceeds the level of the stop such that a portion of the secondary float may travel separately within the upper portion of the conduit. The secondary float preferable includes an elongate portion that passes through an aperture in the primary float, and a buoyant upper portion that is located above the primary float and is larger than the aperture in the primary float. The secondary float also preferably includes a lower portion that is located below the primary float and is larger than the aperture in the primary float. The length of the elongate member between the upper and lower portions may be provided to correspond to a distance between a lower surface of the primary float when engaged by the stop, and a predetermined fluid level in the conduit such as the maximum fill level of the reservoir. The elongate member may also include markings calibrated to indicated a remaining fluid capacity of the reservoir relative to a predetermined capacity. A temperature control unit that includes a sight glass with the aforementioned primary and secondary floats is also disclosed.

12 Claims, 3 Drawing Sheets

TEMPERATURE CONTROL UNIT AND SIGHT GLASS

FIELD OF THE INVENTION

Embodiments of the invention relate to sight glasses for indicating the level of a fluid within a temperature control unit or other device having a fluid reservoir.

BACKGROUND TECHNOLOGY

Photolithographic processes typically use a device called a "stepper" for projecting a pattern onto a semiconductor wafer. It is important to maintain the projection lens of the stepper at a constant temperature to prevent damage to the lens and to provide accurate projection of the pattern. Temperature regulation is achieved by a temperature control unit (TCU). Examples of current commercially available TCUs are the 900/500/300 series of temperature control devices produced by ASM Lithography.

FIG. 1 provides a generic illustration of a stepper and TCU. The temperature control unit 100 includes a reservoir 102 that provides a cooling fluid to a stepper 104 through a heat exchanger 106 and receives heated fluid back from the stepper 104. To assist the operator in determining the level of fluid in the reservoir 102, the TCU also includes a sight glass 108 that is in communication with the reservoir 102. In this arrangement, fluid fills the sight glass 108 to the same level as fluid within the reservoir 102, allowing the level of fluid in the reservoir 102 to be judged by the level of fluid in the sight glass 108.

The TCU further includes a fluid level sensor 110 that monitors the level of fluid in the reservoir 102 and provides a signal to the stepper 104 when fluid falls below a minimum level that is required to maintain a stable operating temperature. For proper operation of the stepper 104 it is essential to maintain the amount of fluid in the reservoir 102 within an operating range, because when the fluid falls below the required minimum level the stepper automatically shuts down, and restarting and stabilizing the stepper can take eight to twelve hours before a stable operating condition is achieved.

One disadvantage of conventional sight glasses generally is that their usefulness tends to be degraded over time as deposits from the fluid within the sight glass obscure their clarity. This makes it progressively more difficult to read the fluid level within the sight glass. As a result, a low fluid level condition may be overlooked because it cannot be viewed without close examination, leading to stepper shutdown.

A further disadvantage of sight glasses in some TCUs is that the sight glass does not cover the full filling range of the reservoir. FIG. 2 shows an example of a sight glass of a conventional TCU. In this configuration, a sight glass 200 comprises part of a conduit 202 that is in communication with a reservoir (not shown). The conduit further comprises upper and lower portions 204, 206 that are not transparent or are blocked from view by other structures of the TCU. The maximum fill level 208 of the reservoir is within the upper portion 204 of the conduit, and as a result, it is not possible for an operator to judge whether a fluid level that is above the range of the sight glass is approaching the maximum fill level. Nevertheless, the operator is motivated to fill the reservoir as much as possible to help ensure that the reservoir does not fall below the minimum level and initiate stepper shut down. As a result, an operator may attempt to fill the reservoir beyond the level that is visible in the sight glass, but will be unable to know when to stop filling to avoid overflow. This creates a dangerous condition since overflow can result in damage to equipment and dangerous conditions such as electrical short circuit.

SUMMARY OF THE INVENTION

Embodiments of the invention provide solutions to problems of the conventional sight glasses and conventional temperature control units.

In accordance with a preferred embodiment, an apparatus for indicating a fluid level in a reservoir includes a conduit for communication with a reservoir and including a sight glass. A buoyant primary float is provided within the conduit, and a stop is provided within the conduit for engaging the primary float to prevent travel of the primary float beyond an upper portion of the sight glass. A buoyant secondary float in the conduit is moveable together with the primary float when the primary float is not engaged by the stop, and that is moveable separately from the primary float beyond the upper portion of the sight glass the when the primary float is engaged by the stop. The secondary float preferable includes an elongate portion that passes through an aperture in the primary float, and a buoyant upper portion that is located above the primary float and is larger than the aperture in the primary float. The secondary float also preferably includes a lower portion that is located below the primary float and is larger than the aperture in the primary float. The length of the elongate member between the upper and lower portions may be provided to correspond to a distance between a lower surface of the primary float when engaged by the stop, and a predetermined fluid level in the conduit such as the maximum fill level of the reservoir. The elongate member may also include markings calibrated to indicated a remaining fluid capacity of the reservoir relative to a predetermined capacity.

In accordance with another preferred embodiment, a temperature control unit includes a sight glass with primary and secondary floats as previously described.

DESCRIPTION OF PREFERRED EMBODIMENTS

Figure 3:
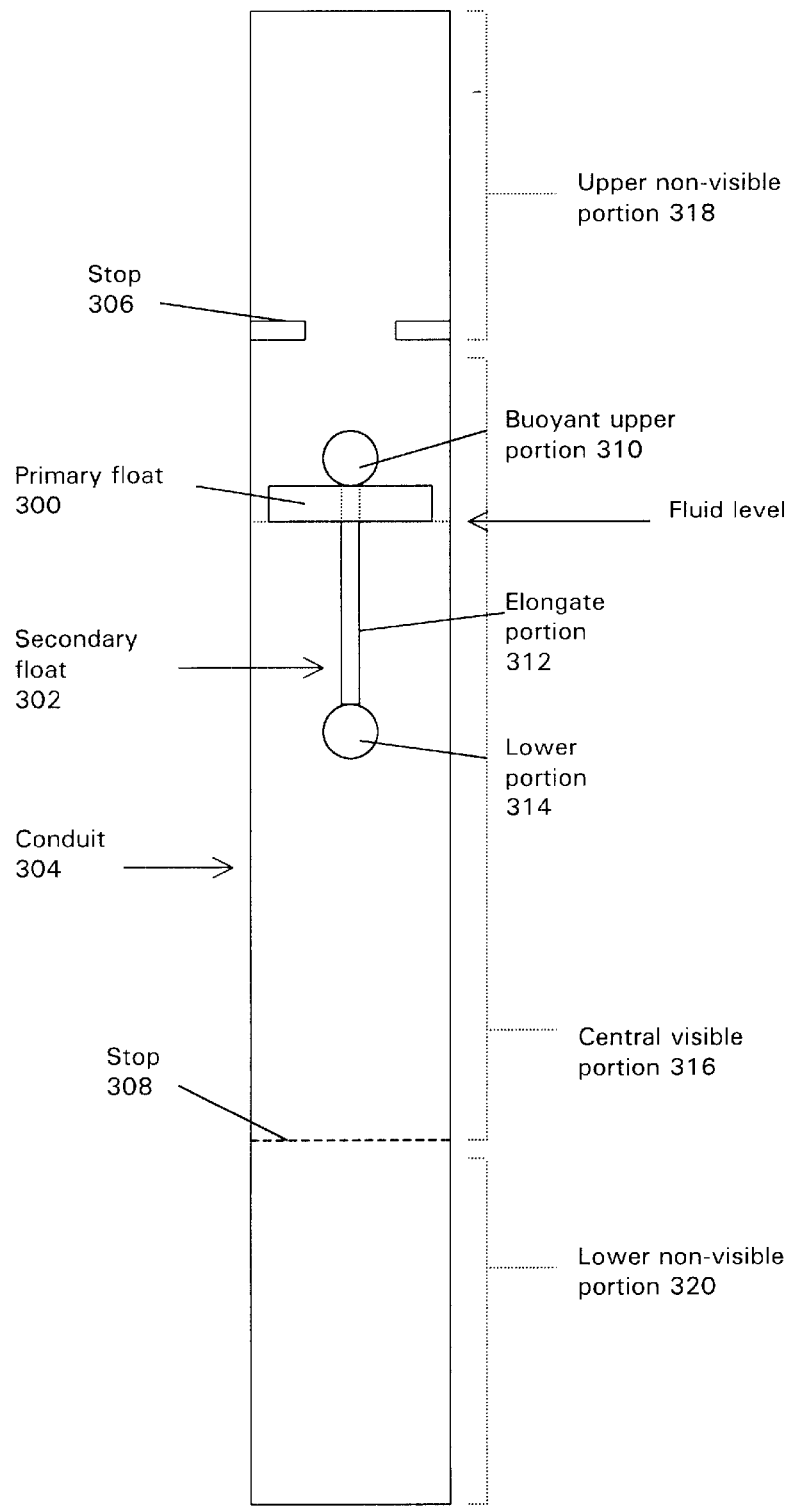
FIG. 3 shows a sight glass in accordance with a preferred embodiment of the invention.

FIG. 3 shows a preferred embodiment of the invention. In this embodiment, a primary float 300 and a secondary float 302 are provided within a conduit 304 that is in fluid communication with a reservoir (not shown). The conduit 304 is preferably circular cylindrical in shape, and includes a central visible portion 316 and upper and lower non-visible portions 318, 320. In the illustrated implementation, the central visible portion 316 is a sight glass and the non-visible portions are comprised of non-transparent tubing that is coupled to the sight glass. However, the non-visible portions may be non-visible for other reasons, such as being blocked by other structures.

The primary float 300 is composed of a buoyant material and floats atop fluid within the conduit. Accordingly, the position of the primary float 300 indicates a fluid level within the sight glass, and hence within the reservoir. The primary float 300 is preferably brightly colored so as to be easily visible even if the clarity of the sight glass is obscured.

A stop 306 is provided in the conduit. The stop 306 is implemented as an annular structure anchored to or integral with the inner wall of the conduit and having a sufficient inner diameter to engage the primary float 300. When the fluid level within the conduit exceeds the visible portion 316, the primary float 300 is engaged by the stop to prevent its travel beyond the level of the stop. The stop is positioned to prevent travel of the primary float 300 into an upper portion of the conduit. Preferably the primary float 300 is engaged before it travels completely into the upper non-visible portion 318.

A stop 308 is also provided in the conduit near the junction of the visible portion 316 and the lower non-visible portion 320 to prevent the primary and secondary floats from being drawn into the reservoir if the reservoir level falls below the level of the conduit. This stop 308 is preferably implemented as a removable mesh or screen that allows the floats to be inserted into the sight glass when the sight glass is decoupled from the tubing.

The secondary float 302 comprises an upper buoyant portion 310 and an elongate portion 312. In the preferred embodiment of FIG. 3, a buoyant spherical upper portion and a spherical lower portion 314 are joined to respective ends of the elongate portion 312. The elongate portion 312 passes freely through an aperture in the primary float 300, and the upper and lower portions 310, 314 are larger than the aperture and therefore limit the travel of the secondary float relative to the primary float. Like the primary float, it is preferable that the secondary float is brightly colored so as to be highly visible.

Figure 4:
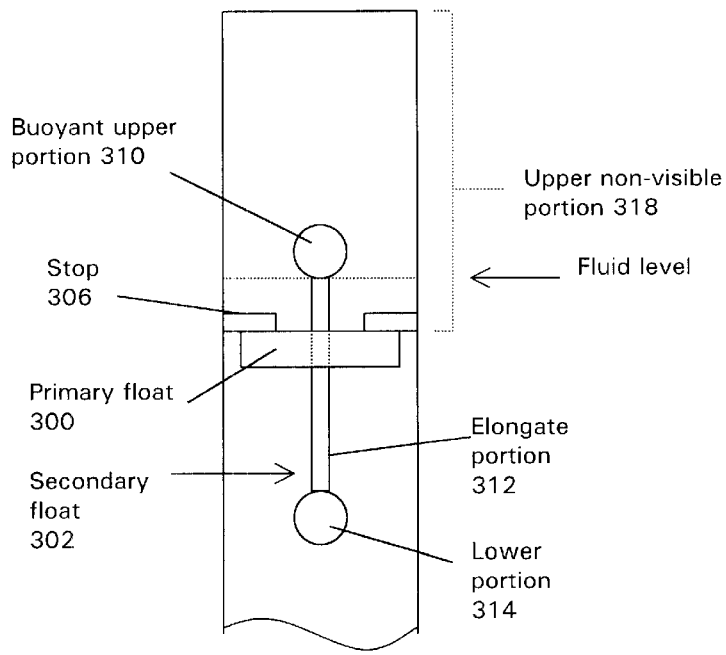
FIG. 4 shows the sight glass of FIG. 3 where a fluid level exceeds a visible portion of the sight glass.

FIG. 3 illustrates the preferred embodiment when the fluid level in the conduit is within the central visible portion 316. Under these circumstances the primary float 300 is not engaged by the stop 306 and the upper portion 310 of the secondary float rests on the primary float 300 and is moveable together with the primary float. In contrast, FIG. 4 illustrates the preferred embodiment when fluid level in the conduit exceeds the level of the stop 306 that is located at the boundary of the visible and non-visible portions. Under these circumstances, the fluid level would not be discernible in a conventional system. However, in the preferred embodiment of FIG. 4, while the primary float 300 is engaged by the stop 306 and remains within the visible portion 316 of the conduit, the buoyant upper portion 310 of the secondary float passes through the inner diameter of the stop 306 and is moveable separately from the primary float such that a portion of the secondary float travels separately within the non-visible portion 318. Therefore, as shown in FIG. 4, the portion of the secondary float that remains visible within the visible portion is decreased, thus indicating that the fluid level has exceeded the top of the visible portion of the conduit.

Figure 5:
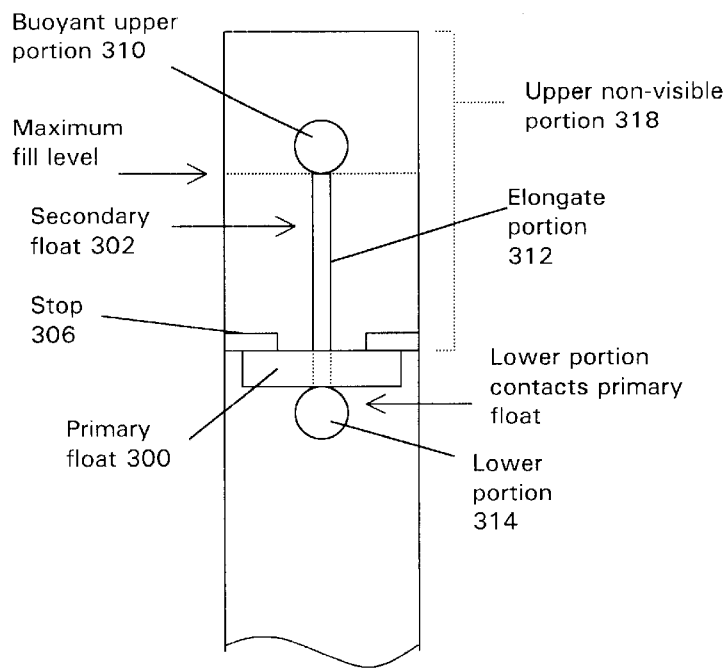
FIG. 5 shows the sight glass of FIG. 3 where a fluid level is at the maximum fill level of a reservoir.

While embodiments of the invention may simply provide an elongate member whose movement indicates that the fluid level exceeds the visible portion, in preferred embodiments, the length of the elongate member is chosen to correspond to a predetermined fill level such as the maximum fill level of the reservoir. FIG. 5 illustrates the primary and secondary float of the preferred embodiment when the fluid level in the conduit reaches the maximum fill level of the reservoir. In this condition, the secondary float 302 is fully extended to its uppermost position relative to the primary float. The length of the elongate member corresponds to the distance between the maximum fill level of the reservoir, and the lower surface of the primary float 300 when it is engaged by the stop 306. With this configuration, contact of the lower portion 314 of the secondary float 302 with the bottom of the primary float 300 shows that the reservoir has been filled to at least the maximum fill level. In practice, this embodiment allows an operator to fill the reservoir to the level visible in the visible portion, and then to continue filling the reservoir while monitoring the travel of the secondary float 302 relative to the primary float 300 so that the proximity of the fluid level to the maximum fill level is known.

It is also preferable to provide the elongate member with markings that help to indicate the remaining fluid capacity of the reservoir. For example, markings on the elongate member may be calibrated to indicate the number of gallons or liters of fluid that may be received by the reservoir without exceeding the maximum fill level.

Figure 1:
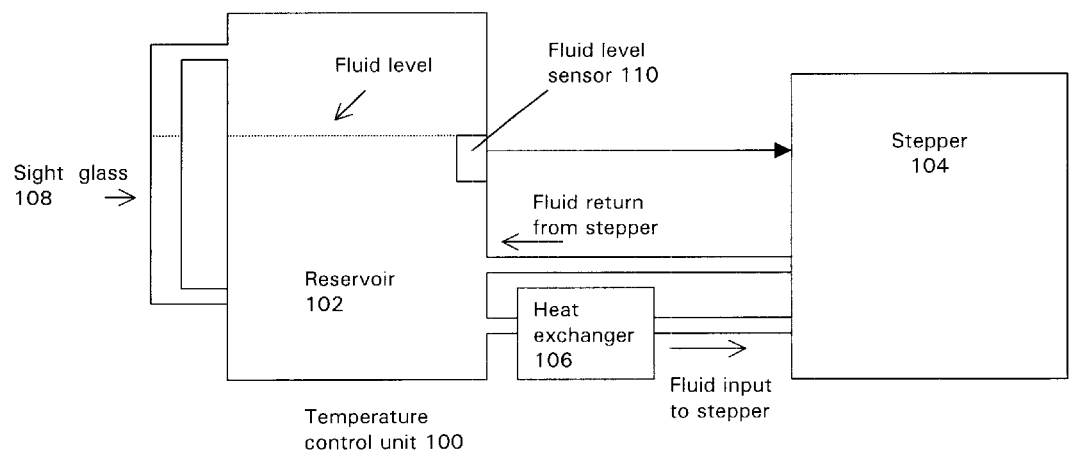
FIG. 1 shows a conventional temperature control unit.
Figure 2:
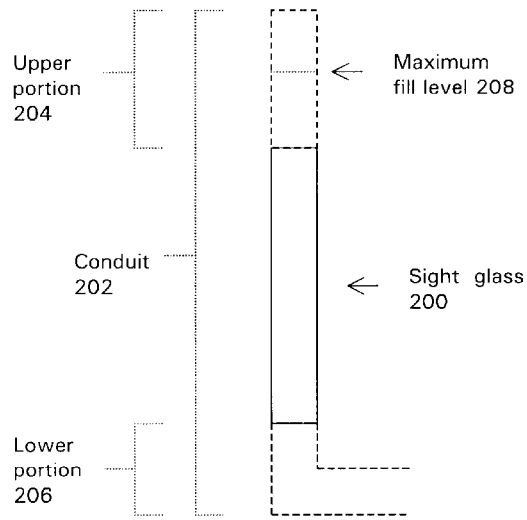
FIG. 2 shows a sight glass of a conventional temperature control unit.

In a further preferred embodiment of the invention, a float as described with respect to FIGS. 3–5 is implemented in a TCU as described with respect to FIGS. 1 and 2. Thus the temperature control unit comprises a reservoir and a conduit that is in communication with the reservoir and includes a visible portion. Within the conduit are a buoyant primary float and a buoyant secondary float. A stop is provided within the conduit for engaging the primary float to prevent travel of the primary float beyond an upper end of the visible portion. The secondary float is moveable together with the primary float when the primary float is not engaged by the stop, and that is moveable separately from the primary float beyond the upper end of the visible portion when the primary float is engaged by the stop.

The foregoing description relates to preferred embodiments of the invention. However, those having ordinary skill in the art will recognize a variety of alternative organizations and implementations that fall within the spirit and scope of the invention as defined by the following claims.

What is claimed is:

1. An apparatus for indicating a fluid level in a reservoir, comprising:
   a conduit for communication with a reservoir and including a sight glass;
   a buoyant primary float within the conduit;
   a stop within the conduit for engaging the primary float to prevent travel of the primary float into an upper portion of the conduit; and
   a buoyant secondary float within the conduit that is moveable together with the primary float when the primary float is not engaged by the stop, and that is moveable separately from the primary float when the primary float is engaged by the stop and a fluid level in the conduit exceeds the level of the stop, such that a portion of the secondary float may travel separately within the upper portion of the conduit.

2. The apparatus claimed in claim 1, wherein the secondary float includes an elongate portion that passes through an aperture in the primary float and a buoyant upper portion that is located above the primary float and is larger than the aperture in the primary float.

3. The apparatus claimed in claim 2, wherein the secondary float further includes a lower portion that is located below the primary float and is larger than the aperture in the primary float.

4. The apparatus claimed in claim 3, wherein the length of the elongate member between the upper and lower portions corresponds to a distance between a lower surface of the primary float when engaged by the stop, and a predetermined fluid level in the conduit.

5. The apparatus claimed in claim 4, wherein the predetermined fluid level in the conduit corresponds to a maximum fill level of the reservoir.

6. The apparatus claimed in claim 5, wherein the elongate member includes markings calibrated to indicated a remaining fluid capacity of the reservoir relative to a predetermined capacity.

7. A temperature control unit comprising:
   a reservoir;
   a conduit in communication with the reservoir and including a visible portion and an upper non-visible portion;
   a buoyant primary float within the conduit;
   a stop within the conduit for engaging the primary float to prevent travel of the primary float completely into the upper non-visible portion; and
   a buoyant secondary float within the conduit that is moveable together with the primary float when the primary float is not engaged by the stop, and that is moveable separately from the primary float when the primary float is engaged by the stop and a fluid level in the conduit exceeds the level of the stop, such that a portion of the secondary float may travel separately within the upper non-visible portion of the conduit.

8. The temperature control unit claimed in claim 7, wherein the secondary float includes an elongate portion that passes through an aperture in the primary float and a buoyant upper portion that is located above the primary float and is larger than the aperture in the primary float.

9. The temperature control unit claimed in claim 8, wherein the secondary float further includes a lower portion that is located below the primary float and is larger than the aperture in the primary float.

10. The temperature control unit claimed in claim 9, wherein the length of the elongate member between the upper and lower portions corresponds to a distance between a lower surface of the primary float when engaged by the stop, and a predetermined fluid level in the reservoir.

11. The temperature control unit claimed in claim 10, wherein the predetermined fluid level in the conduit is a maximum fill level of the reservoir.

12. The temperature control unit claimed in claim 11, wherein the elongate member includes markings calibrated to indicated a remaining fluid capacity of the reservoir relative to a predetermined capacity.

* * * * *